(12) United States Patent
Holt

(10) Patent No.: US 7,849,452 B2
(45) Date of Patent: *Dec. 7, 2010

(54) MODIFICATION OF COMPUTER APPLICATIONS AT LOAD TIME FOR DISTRIBUTED EXECUTION

(75) Inventor: John M. Holt, Wahroonga (AU)

(73) Assignee: Waratek Pty Ltd., Lindfield, New South Wales (AU)

( * ) Notice: Subject to any disclaimer, the term of this patent is extended or adjusted under 35 U.S.C. 154(b) by 430 days.

This patent is subject to a terminal disclaimer.

(21) Appl. No.: 10/830,042

(22) Filed: Apr. 23, 2004

(65) Prior Publication Data

US 2005/0240737 A1   Oct. 27, 2005

(51) Int. Cl.
  *G06F 9/45* (2006.01)
  *G06F 15/16* (2006.01)
  *G06F 15/76* (2006.01)

(52) U.S. Cl. .................. 717/159; 717/153; 717/155; 709/201; 709/245; 712/28; 719/316

(58) Field of Classification Search ................. 717/130, 717/166
See application file for complete search history.

(56) References Cited

U.S. PATENT DOCUMENTS

| | | |
|---|---|---|
| 4,969,092 A | 11/1990 | Shorter |
| 5,214,776 A | 5/1993 | Bagnoli et al. |
| 5,291,597 A | 3/1994 | Shorter et al. |
| 5,418,966 A | 5/1995 | Madduri |
| 5,434,994 A | 7/1995 | Shaheen et al. |
| 5,488,723 A | 1/1996 | Baradel et al. |
| 5,544,345 A | 8/1996 | Carpenter et al. |
| 5,568,609 A | 10/1996 | Sugiyama et al. |
| 5,612,865 A | 3/1997 | Dasgupta |
| 5,802,585 A * | 9/1998 | Scales et al. ................. 711/154 |
| 5,918,248 A | 6/1999 | Newell et al. |
| 5,960,087 A | 9/1999 | Tribble et al. |
| 6,049,809 A | 4/2000 | Raman et al. |
| 6,101,527 A * | 8/2000 | Lejeune et al. .............. 709/201 |
| 6,148,377 A | 11/2000 | Carter et al. |

(Continued)

FOREIGN PATENT DOCUMENTS

EP       0969377      1/2000

(Continued)

OTHER PUBLICATIONS

Bellew, M.; Hsu, M.; Tam, V.-O., "Update propagation in distributed memory hierarchy," Data Engineering, 1990. Proceedings. Sixth International Conference on , vol., No.pp. 521-528, Feb. 5-9, 1990.*

(Continued)

*Primary Examiner*—James Rutten
(74) *Attorney, Agent, or Firm*—Pillsbury Winthrop Shaw Pittman LLP

(57) ABSTRACT

The present invention discloses a modified computer architecture which enables an applications program to be run simultaneously on a plurality of computers. Shared memory at each computer is updated with amendments and/or overwrites so that all memory read requests are satisfied locally. During initial program loading, or similar, instructions which result in memory being re-written or manipulated are identified. Additional instructions are inserted to cause the equivalent memory locations at all computers to be updated.

28 Claims, 7 Drawing Sheets

U.S. PATENT DOCUMENTS

| | | | |
|---|---|---|---|
| 6,163,801 A | 12/2000 | O'Donnell et al. | |
| 6,192,514 B1 | 2/2001 | Lurndal | |
| 6,314,558 B1* | 11/2001 | Angel et al. | 717/118 |
| 6,324,587 B1 | 11/2001 | Trenbeath et al. | |
| 6,327,630 B1 | 12/2001 | Carroll et al. | |
| 6,370,625 B1 | 4/2002 | Carmean et al. | |
| 6,389,423 B1 | 5/2002 | Sakakura | |
| 6,425,016 B1 | 7/2002 | Banavar et al. | |
| 6,571,278 B1 | 5/2003 | Negishi et al. | |
| 6,574,628 B1 | 6/2003 | Kahn et al. | |
| 6,574,674 B1 | 6/2003 | May et al. | |
| 6,611,955 B1* | 8/2003 | Logean et al. | 717/128 |
| 6,625,751 B1 | 9/2003 | Starovic et al. | |
| 6,662,359 B1 | 12/2003 | Berry et al. | |
| 6,668,260 B2 | 12/2003 | Zoltan | |
| 6,682,608 B2 | 1/2004 | Abrams et al. | |
| 6,757,896 B1 | 6/2004 | Cohen et al. | |
| 6,760,903 B1* | 7/2004 | Morshed et al. | 717/130 |
| 6,775,831 B1 | 8/2004 | Carrasco et al. | |
| 6,779,093 B1 | 8/2004 | Gupta | |
| 6,782,492 B1 | 8/2004 | Nakaso | |
| 6,823,511 B1 | 11/2004 | McKenney et al. | |
| 6,862,608 B2* | 3/2005 | Buhlman et al. | 709/213 |
| 6,954,794 B2 | 10/2005 | Rudd et al. | |
| 6,968,372 B1 | 11/2005 | Thompson et al. | |
| 7,010,576 B2 | 3/2006 | Bae | |
| 7,020,736 B1 | 3/2006 | Cherukuri | |
| 7,031,989 B2 | 4/2006 | Elmendorf et al. | |
| 7,047,341 B2 | 5/2006 | Jung | |
| 7,047,521 B2* | 5/2006 | Bunnell | 717/130 |
| 7,058,826 B2 | 6/2006 | Fung | |
| 7,082,604 B2 | 7/2006 | Schneiderman | |
| 7,200,734 B2 | 4/2007 | Hyser | |
| 7,206,827 B2 | 4/2007 | Viswanath et al. | |
| 2002/0199172 A1* | 12/2002 | Bunnell | 717/128 |
| 2003/0004924 A1 | 1/2003 | Williams | |
| 2003/0005407 A1 | 1/2003 | Hines | |
| 2003/0067912 A1 | 4/2003 | Mead et al. | |
| 2003/0105816 A1 | 6/2003 | Goswami | |
| 2004/0073828 A1 | 4/2004 | Bronstein | |
| 2004/0093588 A1* | 5/2004 | Gschwind et al. | 717/130 |
| 2004/0158819 A1* | 8/2004 | Cuomo et al. | 717/128 |
| 2004/0163077 A1* | 8/2004 | Dimpsey et al. | 717/130 |
| 2005/0039171 A1* | 2/2005 | Avakian et al. | 717/127 |
| 2005/0086384 A1 | 4/2005 | Ernst | |
| 2005/0108481 A1 | 5/2005 | Iyengar et al. | |
| 2005/0240737 A1 | 10/2005 | Holt | |
| 2005/0257219 A1 | 11/2005 | Holt | |
| 2005/0262313 A1 | 11/2005 | Holt | |
| 2005/0262513 A1 | 11/2005 | Holt | |
| 2006/0020913 A1 | 1/2006 | Holt | |
| 2006/0080389 A1 | 4/2006 | Powers et al. | |
| 2006/0095483 A1 | 5/2006 | Holt | |
| 2006/0143350 A1 | 6/2006 | Miloushev et al. | |
| 2006/0167878 A1 | 7/2006 | Hartman | |
| 2006/0242464 A1 | 10/2006 | Holt | |
| 2006/0253844 A1 | 11/2006 | Holt | |
| 2006/0265703 A1 | 11/2006 | Holt | |
| 2006/0265704 A1 | 11/2006 | Holt | |
| 2006/0265705 A1 | 11/2006 | Holt | |
| 2008/0072238 A1 | 3/2008 | Monnie et al. | |
| 2008/0189700 A1 | 8/2008 | Schmidt et al. | |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO-02/44835 A2 | 6/2002 |
| WO | WO03/083614 | 10/2003 |
| WO | WO-03/083614 A2 | 10/2003 |
| WO | WO03084116 | 10/2003 |
| WO | WO2005/103924 | 11/2005 |
| WO | WO-2005/103924 | 11/2005 |
| WO | WO2005/103925 | 11/2005 |
| WO | WO-2005/103925 | 11/2005 |
| WO | WO2005/103926 | 11/2005 |
| WO | WO-2005/103926 A1 | 11/2005 |
| WO | WO2005/103927 | 11/2005 |
| WO | WO-2005/103927 | 11/2005 |
| WO | WO2005/103928 | 11/2005 |
| WO | WO-2005/103928 | 11/2005 |
| WO | WO2006/110937 | 10/2006 |
| WO | WO2006/110957 | 10/2006 |

OTHER PUBLICATIONS

Radović, Z. and Hagersten, E. 2001. Removing the overhead from software-based shared memory. In Proceedings of the 2001 ACM/IEEE Conference on Supercomputing (Cdrom) (Denver, Colorado, Nov. 10-16, 2001). Supercomputing '01. ACM Press, New York, NY, 56-56.*

Larus et al., "EEL: Machine-Independent Executable Editing", 1995 ACM SIGPLAN '95, pp. 291-300.*

Dmitriev, "Profilling Java Applications Using Code Hotswapping and Dynamic Call Graph Revelation", Jan. 2004 ACM WOSP '04, pp. 139-150.*

X. Chen and V. Allan. MultiJav: A distributed shared memory system based on multiple Java virtual machines. In Proceedings of the Conference on Parallel and Distributed Processing Techniques and Applications, Las Vegas, Nevada, Jun. 1998. Accessed on Aug. 15, 2007 from <http://citeseer.ist.psu.edu/chen98multijav.html>.*

Haumacher, B.; Moschny, T.; Reuter, J.; Tichy, W.F., "Transparent distributed threads for Java," Parallel and Distributed Processing Symposium, 2003. Proceedings. International , vol., No., pp. 7 pp.-, Apr. 22-26, 2003.*

M. Factor, A. Schuster, and K. Shagin., JavaSplit: A runtime for execution of monolithic java programs on heterogeneous collections of commodity workstations, 2003, In IEEE Fifth Int'l Conference on Cluster Computing.*

Factor, M.; Schuster, A.; Shagin, K., "A distributed runtime for Java: yesterday and today," Parallel and Distributed Processing Symposium, 2004. Proceedings. 18th International , vol., No., pp. 159-, Apr. 26-30, 2004.*

Strom, R.; Banavar, G.; Miller, K.; Prakash, A.; Ward, M.; , "Concurrency control and view notification algorithms for collaborative replicated objects," Distributed Computing Systems, 1997., Proceedings of the 17th International Conference on , vol., No., pp. 194-203, May 27-30, 1997.*

Bal et al., "Object Distribution in Orca Using Compile-Time and Run-Time Techniques", Proc. Conference on Object-Oriented Programming Systems, Languages and Applications, pp. 162-177, Sep. 1993.

Bal et al., "Replication Techniques For Speeding Up Parallel Applications On Distributed Systems", Concurrency Practice & Experience, vol. 4, No. 5, pp. 337-355, Aug. 1992.

Bal et al., "Orca: A Language For Parallel Programming of Distributed Systems", IEEE Transactions on Software Engineering, vol. 18, No. 3, pp. 190-205, Mar. 1992.

Bressoud, "TFT: A Software System For Application-Transparent Fault Tolerance", Proc. 28th Annual International Symposium on Fault-Tolerant Computing, pp. 128-137, 1998.

Bal et al., "A Distributed Implementation of the Shared Data-Object Model", Proc. USENIX Workshop on Experiences with Distributed and Multiprocessor Systems, pp. 1-19, Oct. 1989.

da Silva et al., "An Evaluation of cJava System Architecture", IEEE, Proc. of 15th Symposium on Computer Architecture and High Performance Computing, 2003, pp. 1-9.

Aridor et al., "cJVM: a Single System Image of aJVM on a Cluster", IBM Research Laboratory in Haifa.

Gothe et al., "The Distributed Ada Run-time System DARTS", Software-Practice and Experience, vol. 21, No. 1, Nov. 1991, pp. 1249-1263.

Russ et al., "The Hector Distributed Run-Time Environment", NSF Engineering Research Center, pp. 1-21, 1998.

Bennett et al., "Munin: Distributed Shared Memory Based on Type-Specific Memory Coherence", Dept. of Elec. and Computer Engineering, pp. 1-9, ACM, 1990.

Dwarkadas et al., "Evaluation of Release Consistent Softwared Distributed Shared Memory on Emerging Network Technology", Dept. of Computer Science, Rice University, pp. 1-12, 1993.

Bal et al., "Experience with Distributed Programming in Orca", Proc. IEEE CS International Conference on Computer Languages, pp. 79-89, Mar. 1990.

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing , pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19 , Oct. 1998, Fort Lauderdale, FL.

Bal, et al., "Experience with Distributed Programming in Orca", *IEEE CS International Conference on Computer Languages*, pp. 1-23 , Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28$^{th}$ Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9 , Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online] , XP008098868 ISSN: 0302-9743 ISBN: 978-3-540-55940-5- Retreived from the internet URL:http//www.springerlink.com/content/5v 028411810p6m700/> ,vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. Conf. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214 , Sep. 13-15, 1995.

Supplementary European Search Report EP 06 79 0317 Dated Mar. 5, 2009.

Office Action in co-pending U.S. Appl. No. 11/111,781; mailed on Jul. 1, 2009.

Office Actions in co-pending U.S. Appl. No. 11/111,779; mailed Jun. 11, 2009; Nov. 26, 2008 and Dec. 12, 2007.

\* cited by examiner

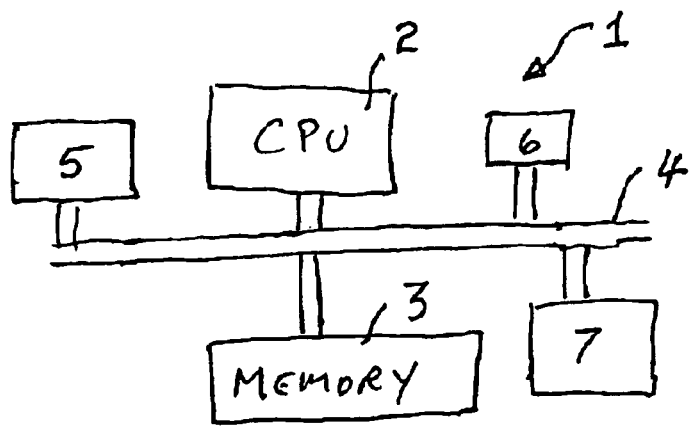
PRIOR ART                     FIG. 1
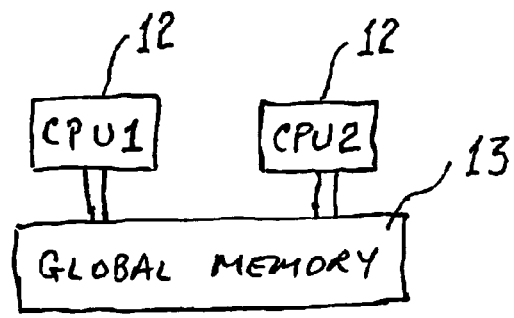
PRIOR ART                     FIG. 2
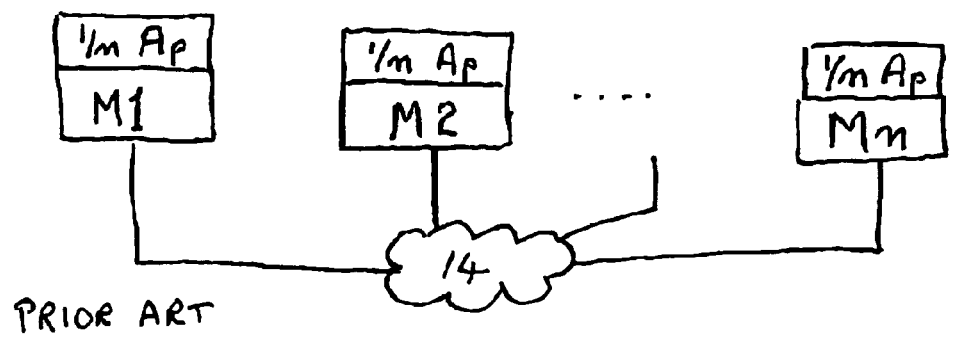
PRIOR ART                     FIG. 3

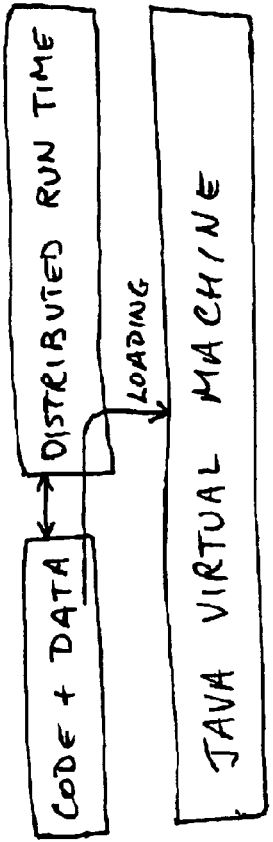
FIG. 7
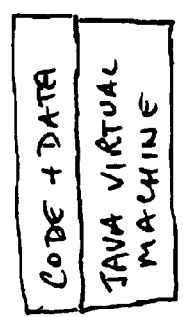
PRIOR ART FIG. 6
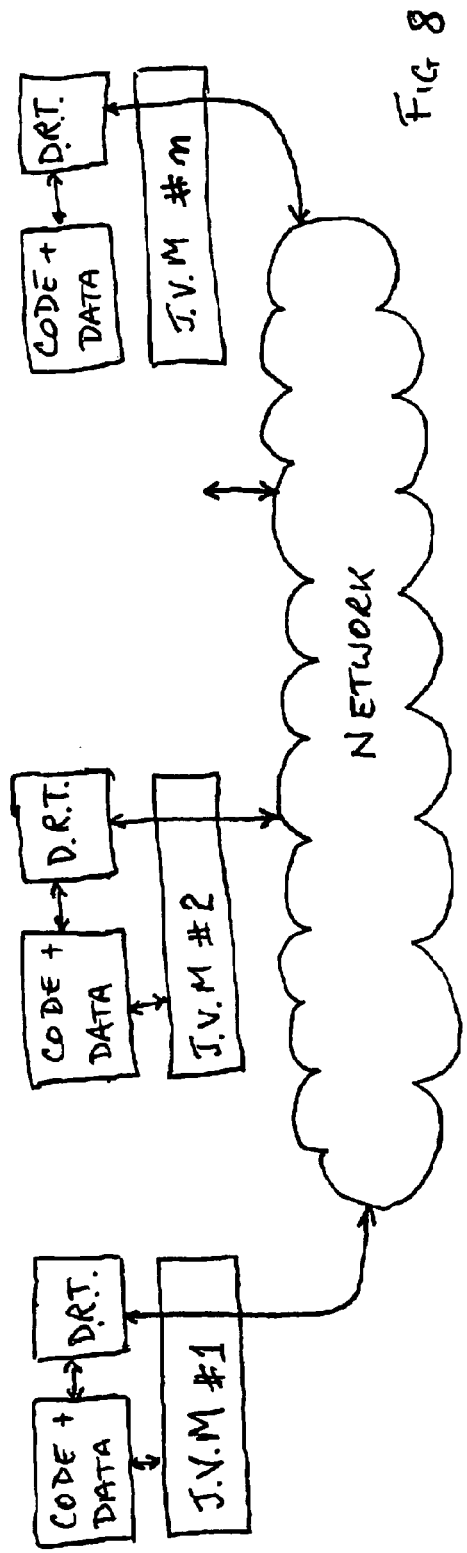
FIG. 8

US 7,849,452 B2

MODIFICATION OF COMPUTER APPLICATIONS AT LOAD TIME FOR DISTRIBUTED EXECUTION

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

The present invention relates to computers and, in particular, to a modified machine architecture which enables improved performance to be achieved.

BACKGROUND ART

Ever since the advent of computers, and computing, software for computers has been written to be operated upon a single machine. As indicated in FIG. 1, that single prior art machine 1 is made up from a central processing unit, or CPU, 2 which is connected to a memory 3 via a bus 4. Also connected to the bus 4 are various other functional units of the single machine 1 such as a screen 5, keyboard 6 and mouse 7.

A fundamental limit to the performance of the machine 1 is that the data to be manipulated by the CPU 2, and the results of those manipulations, must be moved by the bus 4. The bus 4 suffers from a number of problems including so called bus "queues" formed by units wishing to gain an access to the bus, contention problems, and the like. These problems can, to some extent, be alleviated by various stratagems including cache memory, however, such stratagems invariably increase the administrative overhead of the machine 1.

Naturally, over the years various attempts have been made to increase machine performance. One approach is to use symmetric multiple processors. This prior art approach has been used in so called "super" computers and is schematically indicated in FIG. 2. Here a plurality of CPU's 12 are connected to global memory 13. Again, a bottleneck arises in the communications between the CPU's 12 and the memory 13. This process has been termed "Single System Image". There is only one application and one whole copy of the memory for the application which is distributed over the global memory. The single application can read from and write to, (ie share) any memory location completely transparently.

Where there are a number of such machines interconnected via a network, this is achieved by taking the single application written for a single machine and partitioning the required memory resources into parts. These parts are then distributed across a number of computers to form the global memory 13 accessible by all CPU's 12. This procedure relies on masking, or hiding, the memory partition from the single running application program. The performance degrades when one CPU on one machine must access (via a network) a memory location physically located in a different machine.

Although super computers have been technically successful in achieving high computational rates, they are not commercially successful in that their inherent complexity makes them extremely expensive not only to manufacture but to administer. In particular, the single system image concept has never been able to scale over "commodity" (or mass produced) computers and networks. In particular, the Single System Image concept has only found practical application on very fast (and hence very expensive) computers interconnected by very fast (and similarly expensive) networks.

A further possibility of increased computer power through the use of a plural number of machines arises from the prior art concept of distributed computing which is schematically illustrated in FIG. 3. In this known arrangement, a single application program (Ap) is partitioned by its author (or another programmer who has become familiar with the application program) into various discrete tasks so as to run upon, say, three machines in which case n in FIG. 3 is the integer 3. The intention here is that each of the machines M1 . . . M3 runs a different third of the entire application and the intention is that the loads applied to the various machines be approximately equal. The machines communicate via a network 14 which can be provided in various forms such as a communications link, the internet, intranets, local area networks, and the like. Typically the speed of operation of such networks 14 is an order of magnitude slower than the speed of operation of the bus 4 in each of the individual machines M1, M2, etc.

Distributed computing suffers from a number of disadvantages. Firstly, it is a difficult job to partition the application and this must be done manually. Secondly, communicating data, partial results, results and the like over the network 14 is an administrative overhead. Thirdly, the need for partitioning makes it extremely difficult to scale upwardly by utilising more machines since the application having been partitioned into, say three, does not run well upon four machines. Fourthly, in the event that one of the machines should become disabled, the overall performance of the entire system is substantially degraded.

A further prior art arrangement is known as network computing via "clusters" as is schematically illustrated in FIG. 4. In this approach, the entire application is loaded onto each of the machines M1, M2 . . . Mn. Each machine communicates with a common database but does not communicate directly with the other machines. Although each machine runs the same application, each machine is doing a different "job" and uses only its own memory. This is somewhat analogous to a number of windows each of which sell train tickets to the public. This approach does operate, is scalable and mainly suffers from the disadvantage that it is difficult to administer the network.

OBJECT OF THE INVENTION

The object of the present invention is to provide a modified machine architecture which goes some way towards overcoming, or at least ameliorating, some of the abovementioned disadvantages.

SUMMARY OF THE INVENTION

In accordance with a first aspect of the present invention there is disclosed a plurality of computers interconnected via a communications link and operating at least one application program simultaneously.

In accordance with a second aspect of the present invention there is disclosed a method of loading an application program onto each of a plurality of computers, the computers being interconnected via a communications link, the method comprising the step of modifying the application as it is being loaded.

In accordance with a third aspect of the present invention there is disclosed a method of operating at least one application program simultaneously on a plurality of computers all interconnected via a communications link and each having at least a minimum predetermined local memory capacity, said method comprising the steps of:

(i) initially providing each local memory in substantially identical condition, (ii) satisfying all memory reads and writes generated by said application program from said local memory, and (iii) communicating via said communications link all said memory writes at each said computer which take place locally to all the remainder of said plurality of computers whereby the contents of the local memory utilised by each said computer subject to an updating data transmission delay, remains substantially identical.

In accordance with a fourth aspect of the present invention there is disclosed a method of compiling or modifying an application program to run simultaneously on a plurality of computers interconnected via a communications link, said method comprising the steps of:

(i) detecting instructions which share memory records (ii) listing all such shared memory records and providing a naming tag for each listed memory record (iii) detecting those instructions which write to, or manipulate the contexts of, any of said listed memory records, and (iv) generating an alert instruction following each said detected write or manipulate instruction, said alert instruction forwarding the re-written or manipulated contents and name tag of each said re-written or manipulated listed memory record.

In accordance with a fifth aspect of the present invention there is disclosed in a multiple thread processing computer operation in which individual threads of a single application program are simultaneously being processed each on a corresponding one of a plurality of computers interconnected via a communications link, the improvement comprising communicating changes in the contents of local memory physically associated with the computer processing each thread to the local memory of each other said computer via said communications link.

BRIEF DESCRIPTION OF THE DRAWINGS

Embodiments of the present invention will now be described with reference to the drawings in which:

FIG. 1 is a schematic view of the internal architecture of a conventional computer, FIG. 2 is a schematic illustration showing the internal architecture of known symmetric multiple processors, FIG. 3 is a schematic representation of prior art distributed computing, FIG. 6 is a schematic illustration of a prior art computer arranged to operate JAVA code and thereby constitute a JAVA virtual machine, FIG. 7 is a drawing similar to FIG. 6 but illustrating the initial loading of code in accordance with the preferred embodiment, FIG. 8 is a drawing similar to FIG. 5 but illustrating the interconnection of a plurality of computers each operating JAVA code in the manner illustrated in FIG. 7.

DETAILED DESCRIPTION

Figure 4:
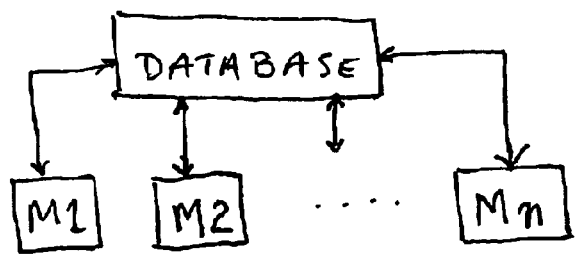
FIG. 4 is a schematic representation of a prior art network computing using clusters.
Figure 5:
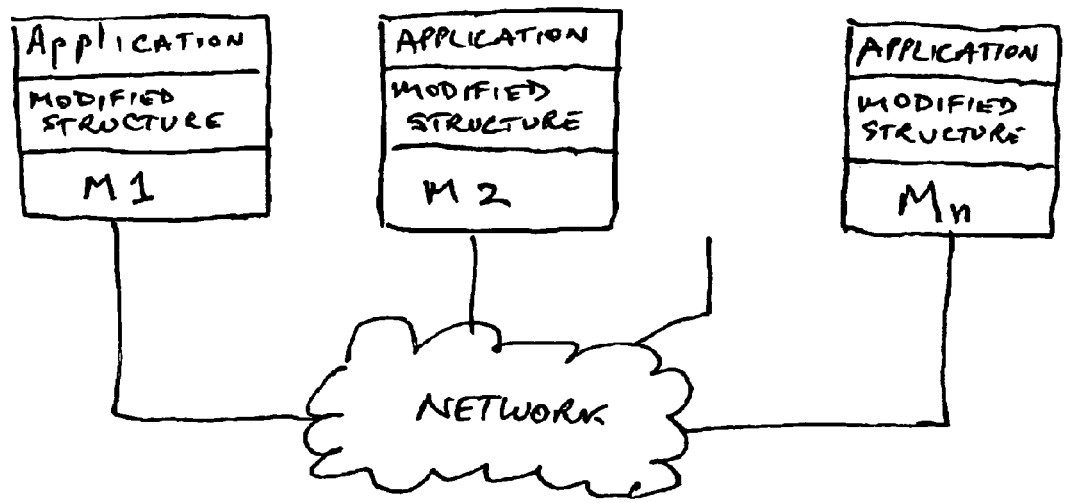
FIG. 5 is a schematic block diagram of a plurality of machines operating the same application program in accordance with a first embodiment of the present invention.

In connection with FIG. 5, in accordance with a preferred embodiment of the present invention a single application can be operated simultaneously on a number of machines M1, M2 . . . Mn. As it will become apparent hereafter, each of the machines operates with the same code and data on each machine and thus all of the machines have the same code and data. In addition, the code stored on each machine has been modified by the same rules (or substantially the same rules since minor optimising changes are permitted).

As a consequence of the above described arrangement, if each of the machines M1, M2 . . . Mn has, say, a shared memory capability of 10 MB, then the total shared memory available to the application is not, as one might expect 10n MB but rather only 10 MB. However, how this results in improved operation will become apparent hereafter. Naturally, each machine has an unshared memory capability. The unshared memory capability of the machines is normally approximately equal but need not be.

It is known from the prior art to operate a machine (produced by one of various manufacturers and having an operating system operating in one of various different languages) in a particular language of the application, by creating a virtual machine. Thus, where the intended language of the application is the language JAVA, a JAVA virtual machine is created which is able to operate code in JAVA irrespective of the machine manufacturer and internal details of the machine.

This well known prior art arrangement is modified in accordance with the preferred embodiment of the present invention by the provision of an additional facility which is conveniently termed "distributed run time" or DRT. In particular, the distributed run time comes into operation during the loading of the JAVA code so as to initially create the JAVA virtual machine. The sequence of operation during loading will be described hereafter in relation to FIG. 9.

FIG. 8 shows in modified form the arrangement of FIG. 5 utilising JAVA virtual machines as illustrated in FIG. 7. It will be apparent that again the same application code and data are loaded onto each machine, however, the communications between each machine although physically routed through the machine hardware, are controlled by the individual DRT within each machine. Thus, in practice this may be conceptionalised as the DRT's communicating with each other via the network rather than the machines themselves.

Figure 9:
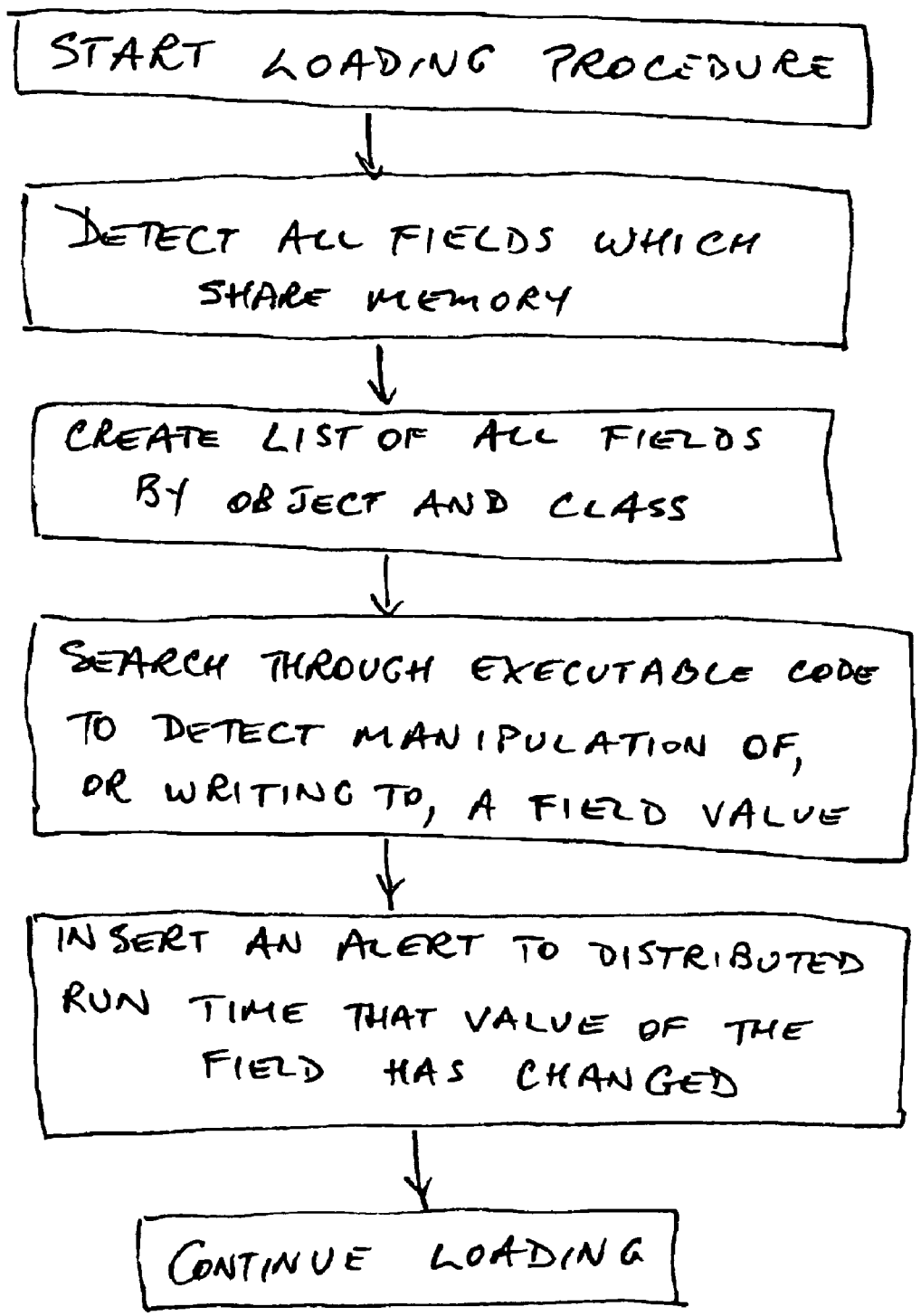
FIG. 9 is a flow chart of the procedure followed during loading of the same application on each machine in the network.

Turning now to FIGS. 7 and 9, during the loading procedure, the program being loaded to create the JAVA virtual machine is modified. This modification involves the initial step of detecting all JAVA fields (or equivalent in other languages) in the application being loaded. Such fields share memory and thus need to be identified for subsequent processing. The DRT during the loading procedure creates a list of all the fields thus identified, the fields being listed by object and class. Both volatile and synchronous fields are listed.

The next phase of the modification procedure is to search through the executable application code in order to locate every processing activity that manipulates field values or writes to field values. When such an operation (typically put static or put field) is detected which changes the field, then through the "instrument" instruction the byte code at that point in the program is changed to insert an alert to the DRT that the value of the field has changed. Thereafter, the loading program continues in a normal way.

Figure 10:
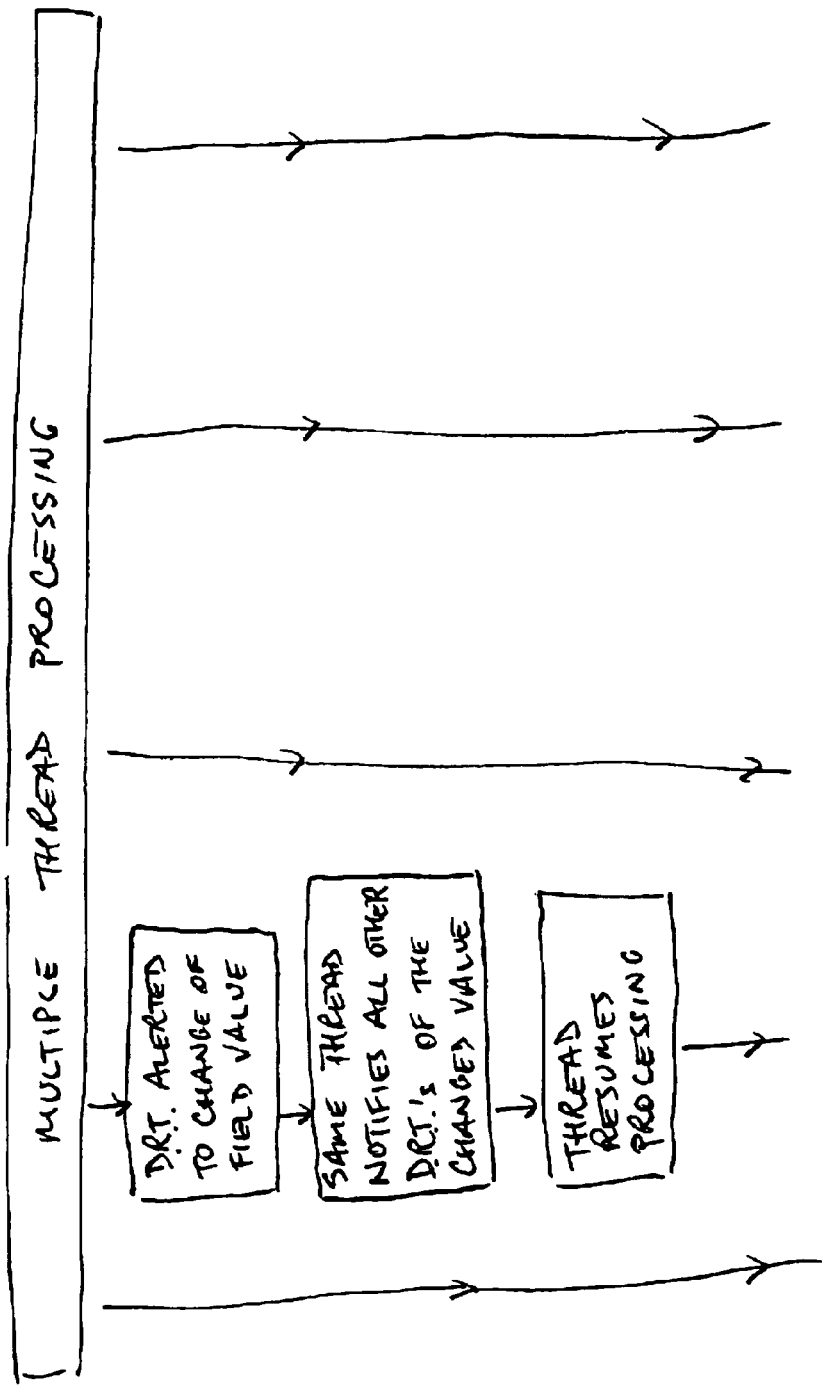
FIG. 10 is a schematic representation of multiple thread processing carried out on the machines of FIG. 8 utilizing a first embodiment of memory updating.
Figure 11:
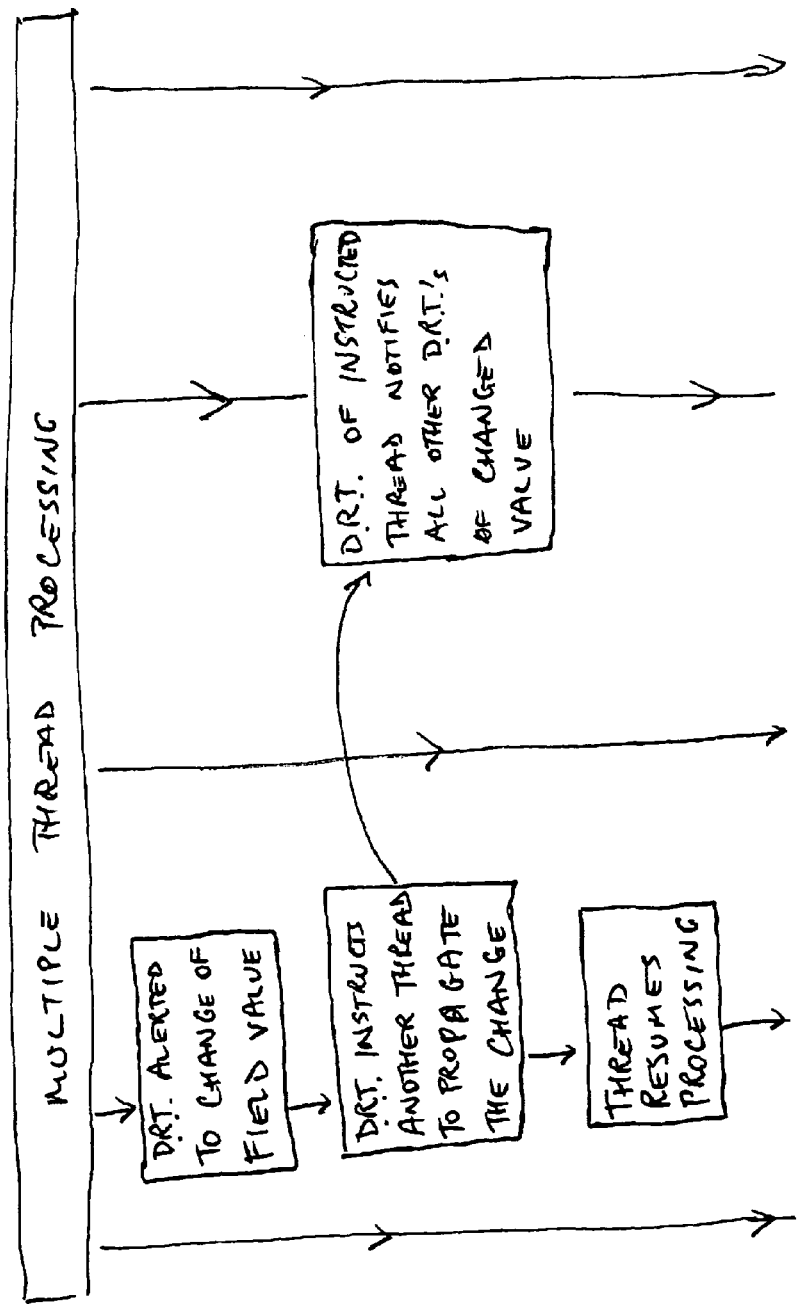
FIG. 11 is a schematic representation similar to FIG. 10 but illustrating an alternative embodiment.

Once this initial modification during the loading procedure has taken place, then either one of the multiple thread processing operations illustrated in FIGS. 10 and 11 takes place. As seen in FIG. 10, multiple thread processing on the machines is occurring and the processing of the second thread (in this example) results in the DRT of that thread being alerted to a change of field value. At this stage the processing of that thread is halted, and the same thread notifies all other DRTs via the network of the changed value. At the end of that communication procedure, the thread then resumes the processing until the next instance where the DRT is alerted to a change of field value.

In the alternative arrangement illustrated in FIG. 11, once the DRT of a thread has been alerted to a change of field value, it instructs the DRT of another thread to notify all other DRTs of the changed value. This is an operation which can be carried out quickly and thus the processing of the "alerted" thread is only interrupted momentarily before the thread resumes processing. The other thread which has been notified of the change then communicates that change to each of the other machines. This embodiment makes better utilisation of the processing power of the various threads (which are not, in general, subject to equal demands) and gives better scaling with increasing size of "n", being an integer greater than or equal to 2 which represents the total number of machines connected to the network. Irrespective of which embodiment is used, the changed field values are propagated to all the other machines on the network.

In the prior art arrangement utilising distributed software, memory accesses from one machine's software to memory physically located on another machine are permitted by the network interconnecting the machines. However, such memory accesses can result in delays in processing of the order of $10^6$-$10^7$ cycles of the central processing unit of the machine. This in large part accounts for the diminished performance of the multiple interconnected machines.

However, in the present arrangement as described above, it will be appreciated that all reading of data is satisfied locally because the current value of all fields is stored on the machine carrying out the processing which generates the demand to read memory. Such local processing can be satisfied within $10^2$-$10^3$ cycles of the central processing unit. Thus, in practice, there is substantially no waiting for memory accesses which involves reads.

However, most application software reads memory frequently but writes to memory relatively infrequently. As a consequence, the rate at which memory is being written or re-written is relatively slow compared to the rate at which memory is being read. Because of this slow demand for writing or re-writing of memory, the fields can be continually updated at a relatively low speed via the inexpensive commodity network, yet this low speed is sufficient to meet the application program's demand for writing to memory.

In a further modification in relation to the above, the changes to fields can be grouped into batches so as to further reduce the demands on the communication speed of the network interconnecting the various machines.

It will also be apparent to those skilled in the art that in the table created by each DRT when initially recording the fields, for each field there is a name which is common throughout the network and which the network recognises. However, in the individual machines the memory location corresponding to a given name field will vary over time since each machine will progressively store changed field values at different locations according to its own internal processes. Thus the table in each of the DRTs will have, in general, different memory locations but each "field name" will have the same "field value" stored in the different memory locations.

It will also be apparent to those skilled in the art that the abovementioned modification of the application program during loading can be accomplished in up to four ways by re-compilation at loading, by a pre-compilation procedure prior to loading, by a "just-in-time" compilation, or by re-compilation after loading. Traditionally the term "compilation" implies a change in code or language, eg from source to object code or one language to another. Clearly the use of the term "compilation" (and its grammatical equivalents) in the present specification is not so restricted and can embrace modifications within the same code or language.

Figure 12:
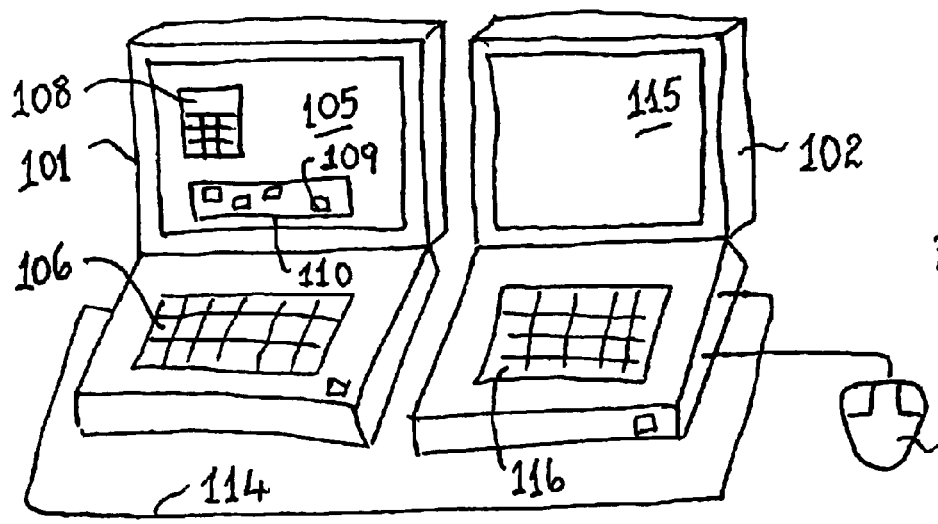
FIG. 12 is a schematic representation of two laptop computers interconnected to simultaneously run a plurality of applications, with both applications running on a single computer.
Figure 13:
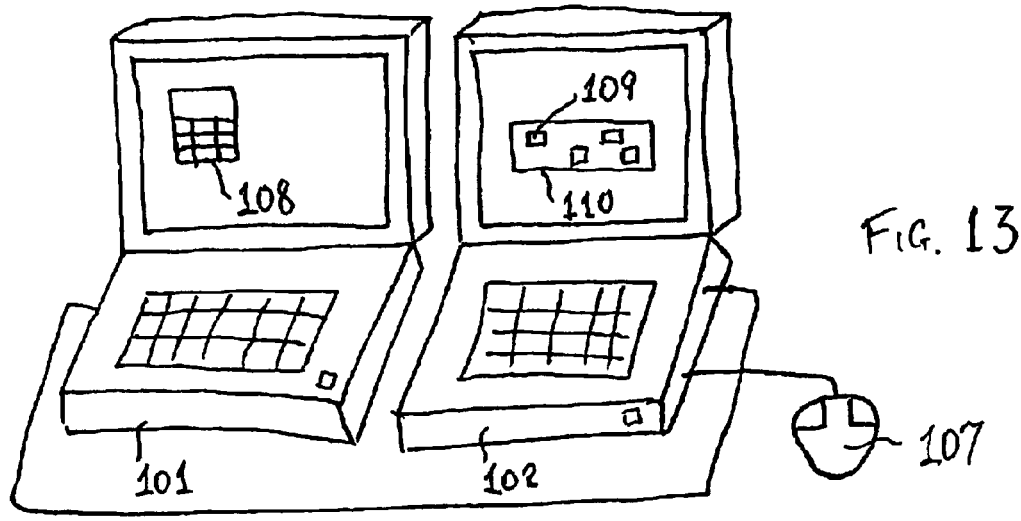
FIG. 13 is a view similar to FIG. 12 but showing the FIG. 12 apparatus with one application operating on each computer.
Figure 14:
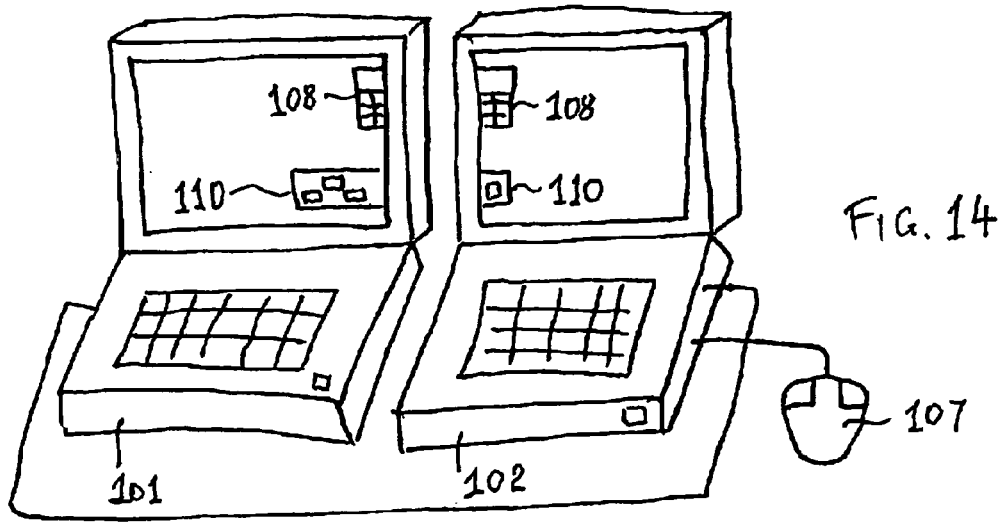
FIG. 14 is a view similar to FIGS. 12 and 13 but showing the FIG. 12 apparatus with both applications operating simultaneously on both computers.

Turning now to FIGS. 12-14, two laptop computers 101 and 102 are illustrated. The computers 101 and 102 are not necessarily identical and indeed, one can be an IBM-clone and the other can be an APPLE computer. The computers 101 and 102 have two screens 105, 115 two keyboards 106, 116 but a single mouse 107. The two machines 101, 102 are interconnected by a means of a single coaxial cable or twisted pair cable 114.

Two simple application programs are downloaded onto each of the machines 101, 102, the programs being modified as they are being loaded as described above. In this embodiment the first application is a simple calculator program and results in the image of a calculator 108 being displayed on the screen 105. The second program is a graphics program which displays four coloured blocks 109 which are of different colours and which move about at random within a rectangular box 110. Again, after loading, the box 110 is displayed on the screen 105. Each application operates independently so that the blocks 109 are in random motion on the screen 105 whilst numerals within the calculator 108 can be selected (with the mouse 107) together with a mathematical operator (such as addition or multiplication) so that the calculator 108 displays the result.

The mouse 107 can be used to "grab" the box 110 and move same to the right across the screen 105 and onto the screen 115 so as to arrive at the situation illustrated in FIG. 13. In this arrangement, the calculator application is being conducted on machine 101 whilst the graphics application resulting in display of box 110 is being conducted on machine 102.

However, as illustrated in FIG. 14, it is possible by means of the mouse 107 to drag the calculator 108 to the right as seen in FIG. 13 so as to have a part of the calculator 108 displayed by each of the screens 105, 115. Similarly, the box 110 can be dragged by means of the mouse 107 to the left as seen in FIG. 13 so that the box 110 is partially displayed by each of the screens 105, 115 as indicated FIG. 14. In this configuration, part of the calculator operation is being performed on machine 101 and part on machine 102 whilst part of the graphics application is being carried out the machine 101 and the remainder is carried out on machine 102.

Example Program Listing

Attention is now directed to example program listings of excerpts in the JAVA language.

1. This first excerpt is part of the modification code. It searches through the code array, and when it finds a putstatic instruction (opcode 178), it implements the modifications. DRT is a Distributed Run Time.

```
// START
byte[ ]code = Code_attribute.code;   // Bytecode of a given method in
a given classfile.
int code_length = Code_attribute.code_length;
int DRT = 99;   // Location of the
CONSTANT_Methodref_ info for the DRT.alert ( )method.
for (int i=0; i<code_length; i++){
    if ((code[i] & 0xff ) == 179){ // Putstatic instruction.
        System.arraycopy(code, i+3, code, i+6, code_length-(i+3));
        code[i+3] = (byte) 184;    // Invokestatic instruction for the
DRT.alert( ) method.
        code[i+4] = (byte) ((DRT >>> 8) & 0xff );
        code[i+5] = (byte) (DRT & 0xff );
    }
}
// END
```

2. This second excerpt is part of the DRT.alert( ) method. This is the body of the DRT.alert( ) method when it is called.

```
// START
public static void alert( ){
    synchronized (ALERT_LOCK){
        ALERT_LOCK.notify( );   // Alerts a waiting DRT thread in the
background.
    }
}
// END
```

3. This third excerpt is part of the Distributed Run Time (DRT) Sending. This code fragment shows the DRT in a separate thread, after being notified, sending the value across the network.

```
// START
MulticastSocket ms = DRT.getMulticastSocket( );   // The multicast
socket used by the DRT for communication.
byte nameTag = 33;   // This is the "name tag" on the network for
this field.
Field field = modifiedClass.getDeclaredField("myField1");   // Stores
the field from the modified class.
    // In this example, the field is a byte field. while (DRT.isRunning( )){
    synchronized (ALERT_LOCK){
        ALERT_LOCK.wait( );   // The DRT thread is waiting for the alert
method to be called.
        byte[ ]b = new byte[ ]{nameTag, field.getByte(null)};   // Stores
the nameTag and the value of the
        // field from the modified class in a buffer.
        DatagramPacket dp = new DatagramPacket(b, 0, b.length);
        ms.send(dp);   // Send the buffer out across the network.
    }
}
// END
```

4. The fourth excerpt is part of the DRT receiving. This is a fragment of code to receive a DRT sent alert over the network.

```
// START
MulticastSocket ms = DRT.getMulticastSocket( );   // The multicast
socket used by the DRT for communication.
DatagramPacket dp = new DatagramPacket(new byte[2], 0, 2);
byte nameTag = 33;   // This is the "name tag"on the network
for this field.
Field field = modifiedClass.getDeclaredField("myField1");   // Stores
the field from the modified class.                                //
In this example, the field is a byte field. while (DRT.isRunning){
    ms.receive(dp);   // Receive the previously sent buffer from the
network.
    byte[ ]b = dp.getData( );
    if (b[0] == nameTag){   // Check the nametags match.
        field.setByte(null, b[1]);   // Write the value from the network
packet into the field location in memory.
    }
}
// END
```

The foregoing describes only some embodiments of the present invention and modifications, obvious to those skilled in the art, can be made thereto without departing from the scope of the present invention.

The term "comprising" (and its grammatical variations) as used herein is used in the inclusive sense of "having" or "including" and not in the exclusive sense of "consisting only of".

The invention claimed is:

1. In a multiple computer system including a plurality of single computers interconnected via a communications link, a method of loading an application program onto each of said plurality of single computers, the application program having application program code including a plurality of code threads all intended to execute on and reference a single computer having a single processing unit or symmetric multiple processing units and a single independent local memory with a local memory capacity that is not shared with any other single computer of said plurality of single computers, the method comprising:

loading the application program written to operate only on a single computer onto each different computer of said plurality of single computers;

modifying the application program on each said different single computer before execution of said corresponding portion of the application program written to operate only on a single computer on each said different single computer;

simultaneously executing different portions of said application program on each different one of the plurality of single computers with each different one of the plurality of single computers having a different independent local memory accessible only by a corresponding portion of the application program; and restricting read requests of each and every said computer such that all read requests of local memory of the requesting computer and not reading from the memory of any other computer;

wherein the step of modifying comprises:

(i) detecting instructions in the unmodified application program which reference the same common memory records;

(ii) listing all such commonly referenced memory records by a distributed runtime (DRT) and providing a naming tag for each said listed commonly referenced memory record;

(iii) detecting those instructions which write to, or manipulate the contents of, any of said listed commonly referenced memory records; and (iv) generating and inserting an alert instruction into the unmodified application program to create the modified application program for handling by the DRT following each said detected commonly referenced memory record write or manipulate instruction indicating that the contents or value of the commonly referenced memory record were re-written or manipulated and may have changed during execution of a code thread, and wherein:

said alert instruction being operative for initiating propagation of the re-written or manipulated contents and name tag of each said re-written or manipulated listed commonly referenced memory record via the communications link to the distributed run times (DRTs) of each other of the single computers;

each DRT creates a table when initially recording fields, and for each field there is a name which is common throughout the network and which the network recognizes; and wherein in different ones of said plurality of single computers, a memory location corresponding to a given name field will vary over time and each of the DRTs will have different memory locations but each field name will have the same field value stored in the different memory locations, and wherein the DRT initially creates a JAVA program language byte code virtual machine for execution of the modified application program; and different portions of said modified application program being simultaneously executable on each different one of the plurality of single computers with each different one of the plurality of single computers having a different independent local memory accessible only by a corresponding portion of the application program.

2. The method as claimed in claim 1 wherein the step of modifying the application program is different for different computers.

3. A method of loading an application program as in claim 1, wherein said program written to operate on only a single computer is a program written to execute within a local processor or processors and local memory coupled to the processor or processors within the single computer.

4. A method of loading an application program as in claim 1, wherein each of the computers operates with the same application program and data and thus all of the plurality of computers have the same application program and data.

5. The method as claimed in claim 4, wherein the interconnection of the plurality of computers via the communications link without forming a distributed shared memory arrangement and the different portions of said application program being simultaneously executable on each different one of the plurality of computers with each different one of the plurality of computers having a different independent local memory accessible only by a corresponding portion of the application program eliminate clock cycle delays that would otherwise be associated with one or said plurality of computers reading memory physically located in a different one or ones of the plurality of computers formed in a distributed shared memory arrangement.

6. The method as claimed in claim 1, wherein the interconnection of the plurality of computers via the communications link without forming a distributed shared memory arrangement and the different portions of said application program being simultaneously executable on each different one of the plurality of computers with each different one of the plurality of computers having a different independent local memory accessible only by a corresponding portion of the application program eliminate clock cycle delays that would otherwise be associated with one or said plurality of computers reading memory physically located in a different one or ones of the plurality of computers formed in a distributed shared memory arrangement.

7. A method of compiling or modifying an application program written to include a plurality of instruction code threads intended to execute on and reference only a single computer having a single central processing unit (CPU) or symmetric multiple processing units and a single independent local memory that is not shared with any other computer of a plurality of single computers but said application program to run simultaneously on each one of said plurality of single computers interconnectable via a communications link, with different portions of said application program being simultaneously executable on different ones of said plurality of single computers with each one of the plurality of single computers having the independent local memory accessible only by the corresponding portion of the application program, said method comprising:

(i) detecting instructions in the unmodified application program which reference the same common memory records;

(ii) listing all such commonly referenced memory records and providing a naming tag for each said listed commonly referenced memory record;

(iii) detecting those instructions which write to, or manipulate the contents of, any of said listed commonly referenced memory records;

(iv) generating and inserting an alert instruction into the unmodified application program to create the modified application program for handling by a distributed run time (DRT) following each said detected commonly referenced memory record write or manipulate instruction indicating that the contents or value of the commonly referenced memory record were re-written or manipulated and may have changed during execution of a code thread, said alert instruction being operative for initiating propagation of the re-written or manipulated contents and name tag of each said re-written or manipulated listed commonly referenced memory record via the communications link to the distributed run times (DRTs) of each other of the single computers; and restricting read requests of each and every said computer such that all read requests of each and every said computer are satisfied by reading only a corresponding independent local memory of the requesting computer and not reading from the memory of any other computer, wherein:

step (ii) includes listing all such commonly referenced memory records by a distributed runtime (DRT) and providing a naming tag for each said listed commonly referenced memory record; and each DRT creates a table when initially recording fields, and for each field there is a name which is common throughout the network and which the network recognizes;

wherein, in different ones of said plurality of single computers, a memory location corresponding to a given name field will vary over time and each of the DRTs will have different memory locations but each field name will have the same field value stored in the different memory locations; and the DRT initially creates a virtual machine for execution of the modified application program.

8. The method as claimed in claim 7, wherein the DRT created virtual machine comprises a JAVA programming language byte code virtual machine for execution of the modified application program.

9. The method as claimed in claim 8, and carried out prior to loading the application program onto each said computer.

10. The method as claimed in claim 8, and carried out during loading of the application program onto each said computer.

11. The method as claimed in claim 8, and carried out by just-in-time compilation.

12. The method as claimed in claim 8, and carried out by re-compilation after loading.

13. A method of compiling or modifying an application program as in claim 8, wherein said program written to operate on only a single computer is a program written to execute within a local processor or processors and local memory coupled to the processor or processors within the single computer.

14. A method as in claim 8, wherein the code thread that alerts the DRT to the re-writing or manipulation and possible change of contents or value of the commonly referenced memory record also performs at least one of:
(i) directly notify and propagate to all other DRTs executing on each other one of the plurality of single computers of the re-writing or manipulation and possible change of contents or value of the commonly referenced memory record and then resumes processing; and
(ii) indirectly notify and propagate by instructing another thread to notify and propagate the all other DRTs executing on each other one of the plurality of single computers of the re-writing or manipulation and possible change of contents or value of the commonly referenced memory record and then resumes processing.

15. A method as in claim 14, wherein when the notification and propagation are indirect, the processing of code thread that alerts the DRT is only interrupted momentarily before the alerted thread processing resumes and said another thread which has been notified of the re-written or manipulated commonly referenced memory record then communicates that re-written or manipulated commonly referenced memory record to each of the other single computers so that better utilization of the processing power of various executing threads and gives better scaling with increasing number of single computers when the application program is executed.

16. A method as in claim 8, wherein the communication link comprises the Internet.

17. A method as in claim 8, wherein the communication link comprises an intranet.

18. A method as in claim 8, wherein the communication link comprises a local area network.

19. A method as in claim 8, wherein the commonly referenced memory locations comprise JAVA programming language fields and the contents or values stored in the commonly referenced memory locations comprise JAVA programming language field contents or values.

20. A method as in claim 8, wherein the commonly referenced memory records comprise JAVA programming language fields and the JAVA programming language fields are listed by object and class.

21. A method as in claim 8, wherein the application program is written in the JAVA programming language and the step of detecting instructions in the unmodified application program which reference the same common memory records comprise searching through the JAVA programming language code and identifying a put static (putstatic) instruction and generating and inserting an alert instruction into the JAVA application program for each said putstatic instruction so identified.

22. A method as in claim 21, further comprising:
modifying the JAVA application program so that during execution of the modified JAVA application program upon executing the inserted alert instruction notification, sending the commonly referenced memory record that was re-written or manipulated and may have changed during execution of a code thread with its name tag across the network and receiving the commonly referenced memory record that was re-written or manipulated and may have changed during execution of a code thread with its name tag by a different computer.

23. A method as in claim 8, wherein a multicast socket is used for a distributed run time (DRT) communication of the commonly referenced memory record that was re-written or manipulated and may have changed during execution of a code thread with its name tag.

24. A method as in claim 8, wherein the updating of all of the commonly referenced memory records that were re-written or manipulated and may have changed during execution of code threads are updated over the Internet.

25. A method as in claim 8, wherein the communication link comprises the Internet and all updates to commonly referenced memory locations are performed using Internet network packets through separate distributed runtimes (DRTs) executing on each of the plurality of single computers.

26. A method as in claim 8, further comprising writing the value from the network packet for the commonly referenced memory record that was rewritten or manipulated and may have changed into the memory location of the receiving computer.

27. In a multiple computer system including a plurality of single computers interconnectable via an Internet or intranet network communications link, a method of loading an original application program onto each of said plurality of single computers, the original application program having original application program code including a plurality of original code threads all written to execute on and reference a single computer having a single processing unit or symmetric multiple processing units and a single local memory with a local memory capacity that is not shared with any other single computer of said plurality of single computers, the system configured to enable simultaneous cooperative execution of said application program by said plurality of single computers, with the original application program being modified to form at least one modified application program with different portions of said modified application program being simultaneously executed within a different independent local processor and a different independent local memory within each different one of the plurality of single computers, said different independent local memory within each said different single computer not forming a distributed shared memory arrangement and being accessible during execution of said application program and said different portions of said application program only by the different portion of the application program actually executing within the different local processing unit or symmetric multiple processing units of the different computer, the method comprising:
loading the application program onto each different computer of said plurality of single computers, said application program including a reference to a program memory field that may be referenced by one or more of said plurality of computers during execution of their respective different portion of the application program; and modifying the application program on each said different single computer before execution of said different portion of the application program on each said different single computer; and restricting read requests of each and every said computer such that all read requests of each and every said computer are satisfied by reading only the corresponding independent local memory of the requesting computer and not reading from the memory of any other computer; and wherein said modification of the application program includes an insertion of at least one code thread prior to execution that upon execution by one of said single computers initiates a sequence of events that result in a network packet communication over said Internet or intranet network communications link that contains an identifier of the referenced memory field and the contents or value of that memory field, wherein said modifying comprises:

(i) detecting instructions in the unmodified application program which reference the same common memory records;

(ii) listing all such commonly referenced memory records by a distributed runtime (DRT) and providing a naming tag for each said listed commonly referenced memory record;

(iii) detecting those instructions which write to, or manipulate the contents of, any of said listed commonly referenced memory records; and (iv) generating and inserting an alert instruction into the unmodified application program to create the modified application program for handling by the DRT following each said detected commonly referenced memory record write or manipulate instruction indicating that the contents or value of the commonly referenced memory record were re-written or manipulated and may have changed during execution of a code thread, and wherein:

said alert instruction are operative for initiating propagation of the re-written or manipulated contents and name tag of each said re-written or manipulated listed commonly referenced memory record via the communications link to the distributed run times (DRTs) of each other of the single computers;

each DRT creates a table when initially recording fields, and for each field there is a name which is common throughout the network and which the network recognizes;

wherein, in different ones of said plurality of single computers, a memory location corresponding to a given name field will vary over time and each of the DRTs will have different memory locations but each field name will have the same field value stored in the different memory locations, and wherein the DRT initially creates a JAVA program language byte code virtual machine for execution of the modified application program; and different portions of said modified application program being simultaneously executable on each different one of the plurality of single computers with each different one of the plurality of single computers having a different independent local memory accessible only by a corresponding portion of the application program.

28. A method as in claim 27, further comprising executing said modified application program and generating and communicating said network packet communication over said Internet or intranet network communications link that contains said identifier of the referenced memory field and the contents or value of said referenced memory field.

* * * * *